UNITED STATES PATENT OFFICE.

ELIEL L. SHARPNECK, OF BAKERSFIELD, CALIFORNIA.

PLASTIC COMPOSITION.

1,326,110.          Specification of Letters Patent.      Patented Dec. 23, 1919.

No Drawing. Application filed May 8, 1918, Serial No. 233,283. Renewed February 26, 1919. Serial No. 279,415.

*To all whom it may concern:*

Be it known that I, ELIEL L. SHARPNECK, a citizen of the United States, residing at Bakersfield, in the county of Kern and State of California, have invented certain new and useful Improvements in Plastic Compositions, of which the following is a specification.

This invention relates to plastic compositions, and particularly to compositions to be used in paving roadways, streets, sidewalks, reservoir linings, or in other situations where a layer of artificial stone must be provided which will resist the effects of wear.

A further object is to provide an improved composition for this purpose of such material that the asphaltum which forms one of the main ingredients of the composition will be rendered insoluble in oil, thus adding very greatly to the lasting quality of the roadway, as the roadway will not be affected by oil accumulating thereon from automobiles.

A further object is to combine with asphaltum materials which not only render the asphaltum insoluble in oil, but which hardens the asphaltum without destroying its adhesive qualities.

A further object is to provide a composition of the character described which is of such character that the road may be constructed for considerably less than the cost of concrete or other roadways now ordinarily used.

Other objects will appear in the course of the following description.

This composition includes a finely divided filler, which may be composed of any soil, sand, earthy matter, or mixture thereof. Preferably, for most purposes, screened sand will be used. The filler is mixed with mineral asphaltum to which has been added certain percentages of rosin, pulverized salt and sulfur, and a certain amount of pulverized limestone or marble dust.

To prepare the above composition, the sand, if sand is used as a filler, is thoroughly screened so that the sand is of uniform size. This screened sand is heated and thoroughly dried to remove all moisture before being mixed. In mixing, the filler is heated to a temperature of 300° to 350° F. and while in this heated condition and before the asphaltum is mixed with it, there is added marble dust, or like material which is distributed evenly over the filler. The mineral asphaltum (which has preferably 40 to 60 penetration) is heated to the same temperature as the filler, that is, to a temperature of from 300° to 350° F. and when the asphaltum has been brought to the proper temperature, there is added to it a certain percentage of rosin, sulfur, and pulverized salt and the heated asphaltum is stirred until all the ingredients are well mixed. The asphaltum and the ingredients mixed therewith are then mixed thoroughly with the filler, the mixing being continued until the mass is of a uniform color and while the mass is maintained at an approximate heat of 300°, the heat may vary from 250° to 350° F. without any great change in the ultimate product.

By heating and mixing the rosin, sulfur and salt, the rosin and the sulfur are caused to melt and become a component part of the asphaltum, the rosin hardening the asphaltum without destroying the adhesive qualities thereof, and the sulfur, salt and rosin so changing the asphaltum that it is insoluble in oil, and making the whole mass impervious to water.

I do not wish to be limited to any particular proportions of the ingredients above called for, as these proportions will vary under different circumstances. With a screened sand filler, however, the best results are secured by using the materials in the following proportions:

| | |
|---|---|
| Screened sand filler | 86 % |
| Mineral asphaltum (40 to 60 penetration) | 6½% |
| Rosin | 1 % |
| Salt (pulverized) | 1¼% |
| Sulfur | ¼% |
| Pulverized limestone | 5 % |
| Total | 100 % |

For a filler consisting of earth and pebbles, the proportions would be about as follows:

| | |
|---|---|
| Earth and pebble filler | 80½% |
| Mineral asphaltum | 9 % |
| Rosin | 2 % |
| Salt | 2 % |
| Sulfur | ½% |
| Limestone (pulverized) | 6 % |
| Total | 100 % |

It will be understood that these proportions are variable, particularly with regard to the proportion of filler to asphaltum. I have found in actual tests that a roadway may be constructed with this surface at about one-half the cost of a roadway having a surface of concrete formed in accordance with the ordinary formula. The asphaltum is about one-half less than ordinarily used in proportion to the filler and this makes a large difference in the cost of building a road. It will be also noted that this mixture or composition is of particular value in that the asphalt is not acted upon by the oil which drops from automobiles or which may gather in a depression of the roadway where an automobile or motor truck has been standing. At the same time, the whole mass is rendered impervious to water.

The heating of the filler and of the other ingredients to 300° or 350° F. while being mixed and applied is of great importance because this heating drives out some of the air included within the mass and thus when the mass is pressed into place by a roller, the particles will be forced into close contiguity with each other and thus the density of the mass will be increased, rendering the resultant pavement very dense and hard.

By the term "rosin" as used in the specification and claims of this case I intend to include other resinous substances, such as pitch. While rosin proper is the best material to use in this composition, yet a resinous substance such as pitch will give good results.

It is necessary in the preparation of this material that the mass be heated and stirred until it ceases to effervesce, this effervescence causing the breaking up of the mixture which brings more of the light oils contained in the asphalt into contact with the heat and when they are heated to the right degree they pass off, thus making the pavement much harder than it otherwise would be. This effervescence is caused by moisture in the mass and as rosin and sulfur contain no moisture it is necessary to add an element which does contain moisture and it is for this purpose that I add crude salt to the mixture. The moisture content of such salt is very large and in the West there are immense deposits of salt which is so cheap that it may be put on the cars at about one dollar a ton. By mixing the salt with the mass, as previously described, I get the moisture necessary for effervescence and thus secure an increase in the penetration point of the asphalt. Both rosin and sulfur will harden the asphalt, though preferably I use but a very small amount of sulfur as an excess of sulfur will make the asphalt brittle. The rosin, however, does not destroy the adhesive qualities of the asphalt. The sulfur assists in making the composition insoluble in oil, but there must be a perfect union between the sulfur and the asphalt. The rosin which I preferably use is that produced in the distillation of turpentine and which does not melt below about 250°.

The powdered limestone assists in making the mass denser, harder and more impervious to moisture by its chemical action when combined with the asphalt and sulfate of aluminum. I do not wish to be limited, however, to the use of this limestone in the composition, as a very good composition may be made without it.

Having described my invention, what I claim is:

1. A plastic composition comprising approximately 86% of finely divided filler, 6 to 12% of mineral asphaltum, 1 to 2% of rosin, 1 to 2% of salt, ¼ to ½% of sulfur, and 5 to 6% of pulverized limestone.

2. A method of forming plastic compositions for the purpose described which consists in heating mineral asphaltum to a temperature of 250 to 350° F., adding thereto rosin, sulfur and pulverized salt, and thoroughly mixing these ingredients with the asphaltum, heating a finely divided filler to a temperature of 250 to 350° F., and adding the filler to this mixed asphaltum, rosin, salt and sulfur and thoroughly mixing the ingredients.

3. The method of forming plastic compositions for the purpose described which consists in heating mineral asphaltum to a temperature of 250° to 350° F., adding thereto rosin, sulfur and pulverized salt, heating a finely divided filler to a temperature of from 250 to 350° F., adding finely pulverized limestone thereto, and uniformly distributing it through the filler, and then thoroughly mixing the asphaltum, rosin, salt and sulfur with the filler and limestone while the mass is maintained at a temperature of from 250° to 350° F.

In testimony whereof I hereunto affix my signature in the presence of two witnesses.

ELIEL L. SHARPNECK.

Witnesses:
EDITH N. SHARPNECK,
IRMA V. MYER.